US008432859B2

(12) United States Patent
Lee et al.

(10) Patent No.: US 8,432,859 B2
(45) Date of Patent: Apr. 30, 2013

(54) INDICATING DYNAMIC ALLOCATION OF COMPONENT CARRIERS IN MULTI-COMPONENT CARRIER SYSTEMS

(75) Inventors: Jung A. Lee, Pittstown, NJ (US); Fang-Chen Cheng, Randolph, NJ (US)

(73) Assignee: Alcatel Lucent, Paris (FR)

( * ) Notice: Subject to any disclaimer, the term of this patent is extended or adjusted under 35 U.S.C. 154(b) by 495 days.

(21) Appl. No.: 12/488,917

(22) Filed: Jun. 22, 2009

(65) Prior Publication Data

US 2010/0322158 A1 Dec. 23, 2010

(51) Int. Cl.
*H04Q 7/00* (2006.01)

(52) U.S. Cl.
USPC ............................................ 370/329

(58) Field of Classification Search ............... None
See application file for complete search history.

(56) References Cited

U.S. PATENT DOCUMENTS

| | | | | |
|---|---|---|---|---|
| 8,184,599 | B2 * | 5/2012 | Gholmieh et al. | 370/335 |
| 8,194,603 | B2 * | 6/2012 | Nimbalker et al. | 370/329 |
| 2006/0274712 | A1 * | 12/2006 | Malladi et al. | 370/345 |
| 2009/0257387 | A1 * | 10/2009 | Gholmieh et al. | 370/329 |
| 2009/0300456 | A1 * | 12/2009 | Pelletier et al. | 714/749 |
| 2010/0172290 | A1 * | 7/2010 | Nam et al. | 370/328 |
| 2010/0232373 | A1 * | 9/2010 | Nory et al. | 370/329 |
| 2010/0238984 | A1 * | 9/2010 | Sayana et al. | 375/219 |
| 2010/0260136 | A1 * | 10/2010 | Fan et al. | 370/330 |
| 2010/0273515 | A1 * | 10/2010 | Fabien et al. | 455/509 |
| 2011/0110441 | A1 * | 5/2011 | Chen et al. | 375/260 |
| 2011/0111785 | A1 * | 5/2011 | Lindoff et al. | 455/513 |
| 2011/0151913 | A1 * | 6/2011 | Forster et al. | 455/509 |
| 2012/0014306 | A1 * | 1/2012 | Pelletier et al. | 370/311 |

FOREIGN PATENT DOCUMENTS

WO WO2010/048178 A1 4/2010

OTHER PUBLICATIONS

3GPP TR 36.814 V1.1.1, "Further Advancement for E-UTRA—Physical Layer Aspects" Jun. 2009.
R1-092219, "Summary of email discussions on bandwidth extension," *Nokia*, May 4-8, 2009.
R1-091664, "CoMP TP for TR," *Qualcomm Europe* Mar. 23-27, 2009 Seoul, South Korea.
R1-092061, "Notion of anchor carrier in LTE-A," *Qualcomm Europe* May 4-8, 2009 San Francisco, CA USA.
R1-091460, "Multicarrier Control for LTE-Advanced," *Qualcomm Europe* Mar. 23-27, 2009 Seoul, Korea.
R1-091809, "Component carrier structures," *Huawei* May 4-8, 2009 San Francisco, CA USA.
R1-091701, "Asymmetric band aggregation and anchor carrier," *ZTE* May 4-8, 2009 San Francisco, CA USA.
R1-092180, "Support of non-backward compatible component carriers," *Nokia, Nokia Siemens Networks* May 4-8, 2009.

(Continued)

*Primary Examiner* — Hassan Phillips
*Assistant Examiner* — Prenell Jones
(74) *Attorney, Agent, or Firm* — Williams, Morgan & Amerson

(57) ABSTRACT

The present invention provides a method involving an access network and user equipment that supports communication over an air interface using a plurality of component carriers. The method includes transmitting information indicating that a first component carrier is an anchor carrier for the user equipment. The information is transmitted from the access network in a first field of the first component carrier, which selected from the plurality of component carriers. The method also includes transmitting information indicating that one or more second component carriers is allocated as a non-anchor carrier for the user equipment.

25 Claims, 5 Drawing Sheets

OTHER PUBLICATIONS

International Search Report and Written Opinion dated Sep. 27, 2010.

CMCC: "*Consideration on reducing blind decoding attempts for separate PDCCH design*", TSG-RAN 56BIS, Mar. 23, 2009, Mar. 25, 2009 pp. 1-6, XP002600621, Seoul, Korea, pp. 3-4.

Motorola: "*Comparison of PDCCH Structures for Carrier Aggregation*", 3GPP Draft; R1-091326, $3^{rd}$ Generation Partnership Project (3GPP), Mobile Competence Centre; 650, Route Des Lucioles; F-06921 Sophia-Antipolis Cedex; France, No. Seoul, Korea; 20090318, Mar. 18, 2009, XP050338924 [retrieved on Mar. 18, 2009] paragraph 3—p. 1.

Huawei: "*PDCCH design for carrier aggregation*", 3GPP Draft; R1-090127 PDCCH Design for carrier aggregation, $3^{rd}$ Generation Partnership Project (3GPP), Mobile Competence Centre; 650, Route Des Lucioles; F-06921 Sophia-Antipolis Cedex; France, No. Ljubljana; 20090107, Jan. 7, 2009, XP050318065 [retrieved on Jan. 7, 2009] p. 1, paragraph 3, paragraph [02.1].

Alcatel-Lucent: "*Component carrier indication for bandwidth extension in LTE-A*"; *3GPP Draft; R1-092330, $3^{rd}$ Generation Partnership Project (3GPP), Mobile Competence Centre; 650, Route Des Lucioles; F-06921 Sophia-Antipolis Cedex; France No. Los Angeles, USA; 20090624, Jun. 24, 2009, XP050350855*[retrieved on Jun. 24, 2009] the whole document.

Alcatel-Lucent: "Component carrier indication for bandwidth extension in LTE-A" 3GPP Draft; R1-093362, $3^{rd}$ Generation Partnership Project (3GPP), Mobile Competence Centre; 650, Route Des Lucioles; F-06921 Sophia-Antipolis Cedex; France, No. Shenzhen, China; 20090819, Aug. 19, 2009, XP050351664 [retrieved on Aug. 19, 2009] the whole document.

Alcatel-Lucent et al: "*Dynamic PDCCH Monitoring Set Configuration*", 3GPP Draft; R1-100916, $3^{rd}$ Generation Partnership Project (3GPP), Mobile Competence Centre; 650, Route Des Lucioles; F-06921 Sophia-Antipolis Cedex; France, vol. RAN WG1, No. San Francisco, USA; 20100222, Feb. 16, 2010, XP050418516 [retrieved on Feb. 16, 2010] the whole document.

\* cited by examiner

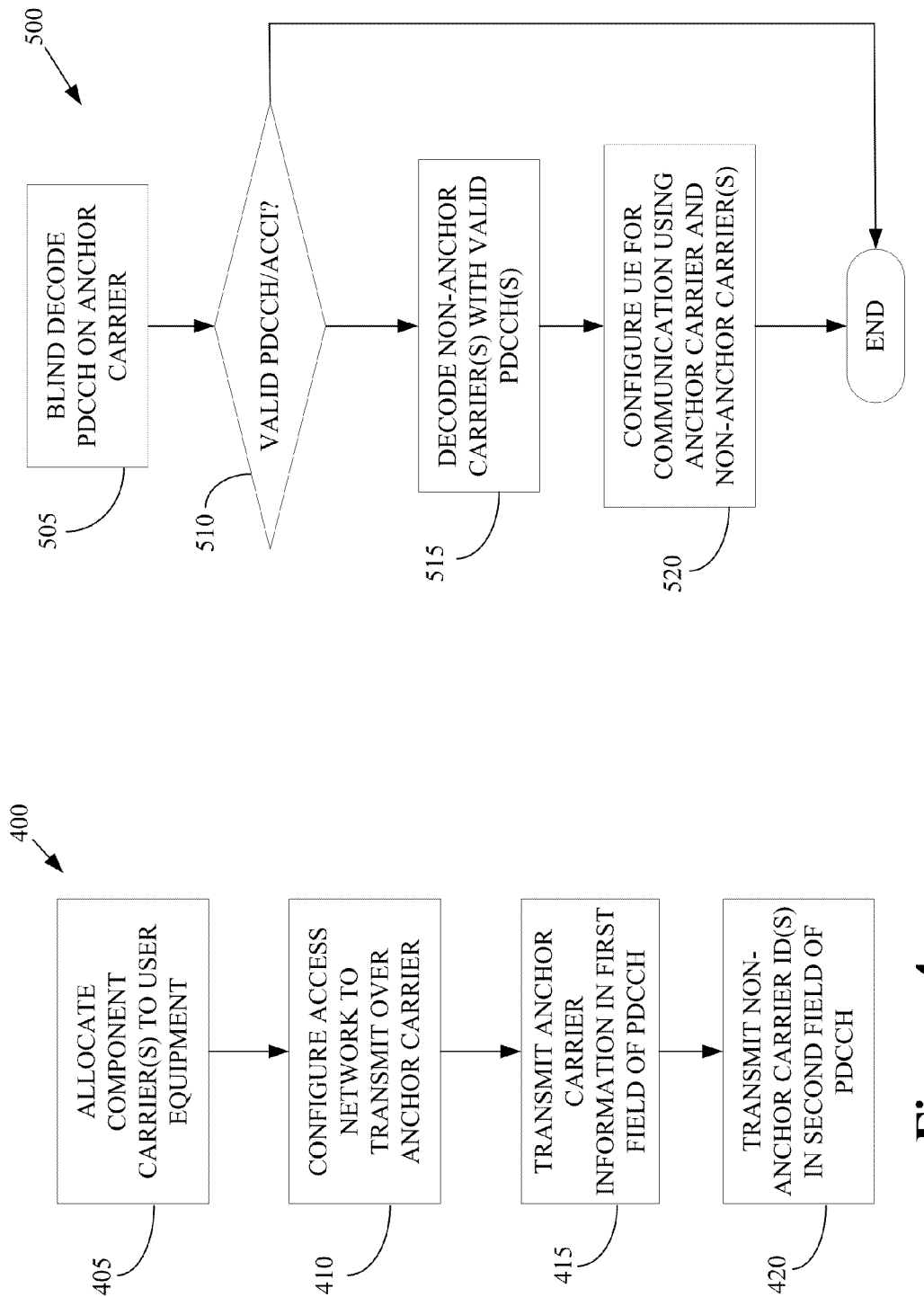

INDICATING DYNAMIC ALLOCATION OF COMPONENT CARRIERS IN MULTI-COMPONENT CARRIER SYSTEMS

BACKGROUND OF THE INVENTION

1. Field of the Invention

This invention relates generally to communication systems, and, more particularly, to wireless communication systems.

2. Description of the Related Art

Wireless communication systems typically support communication over an air interface using a selected bandwidth. For example, conventional wireless communication systems that operate according to the Long Term Evolution (LTE) of the Universal Mobile Telecommunication Services (UMTS) standards and/or protocols allocate a 20 MHz bandwidth for communication over the air interface. However, there is a continuing demand for increased bandwidth and so future deployments of wireless communication equipment, including base stations and user equipment, are expected to support communication over larger bandwidths. For example, at least one planned evolution of the LTE standards and/or protocols is expected to support bandwidths of at least 100 MHz. The expanded bandwidth can be achieved by aggregating multiple component carriers, which can be allocated to the stations and/or user equipment for communication over the air interface.

The multiple component carriers can be separately and independently allocated to user equipment for communication over either the uplink or the downlink. Control information for the multiple component carriers is transmitted over a selected channel, such as a physical downlink control channel (PDCCH). User equipment, such as a handset, or mobile units use the information transmitted over the control channel to synchronize with the network and to receive other information including pilot channel information, broadcast information, paging information, and the like. Since each component carrier in the conventional multi-component communication system supports a control channel, the overhead associated with the control channels increases roughly in proportion to the number of component carriers that are allocated to the user equipment. For example, in one proposed protocol, five component carriers will be used to provide the 100 MHz bandwidth. The signaling channel overhead associated with each of these five components, reduces the bandwidth gain that results from allocating the additional component carriers to the user equipment.

In order to establish a connection over the air interface, user equipment has to determine which of the multiple component carriers have been allocated and then decode control information for the allocated component carriers. The allocated component carriers are not necessarily known to the user equipment in advance, and so, conventional user equipment perform a blind decoding of the signaling channels of all of the available component carriers for all channel hypotheses. Consequently, conventional user equipment expends a significant amount of time and processing power performing the blind decodes. For example, blind decoding of each of the associated signaling channels may require 48 decoding attempts. Thus, in a configuration of a multi-component carrier system that utilizes five component carriers each user equipment would perform 240 blind decodes in each decoding interval (48 decoding attempts/component carrier×5 component carriers=240).

SUMMARY OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided involving an access network and user equipment that supports communication over an air interface using a plurality of component carriers. The method includes transmitting information indicating that a first component carrier is an anchor carrier for the user equipment. The information is transmitted from the access network in a first field of the first component carrier, which selected from the plurality of component carriers. The method also includes transmitting information indicating that one or more second component carriers is allocated as a non-anchor carrier for the user equipment.

BRIEF DESCRIPTION OF THE DRAWINGS

The disclosed subject matter may be understood by reference to the following description taken in conjunction with the accompanying drawings, in which like reference numerals identify like elements, and in which:

FIG. 4 conceptually illustrates one exemplary embodiment of a method of indicating the component carrier allocation;

FIG. 5 conceptually illustrates one exemplary embodiment of a method that can be used by mobile units or user equipment for decoding PDCCH for multiple component carriers;

Figure 1:
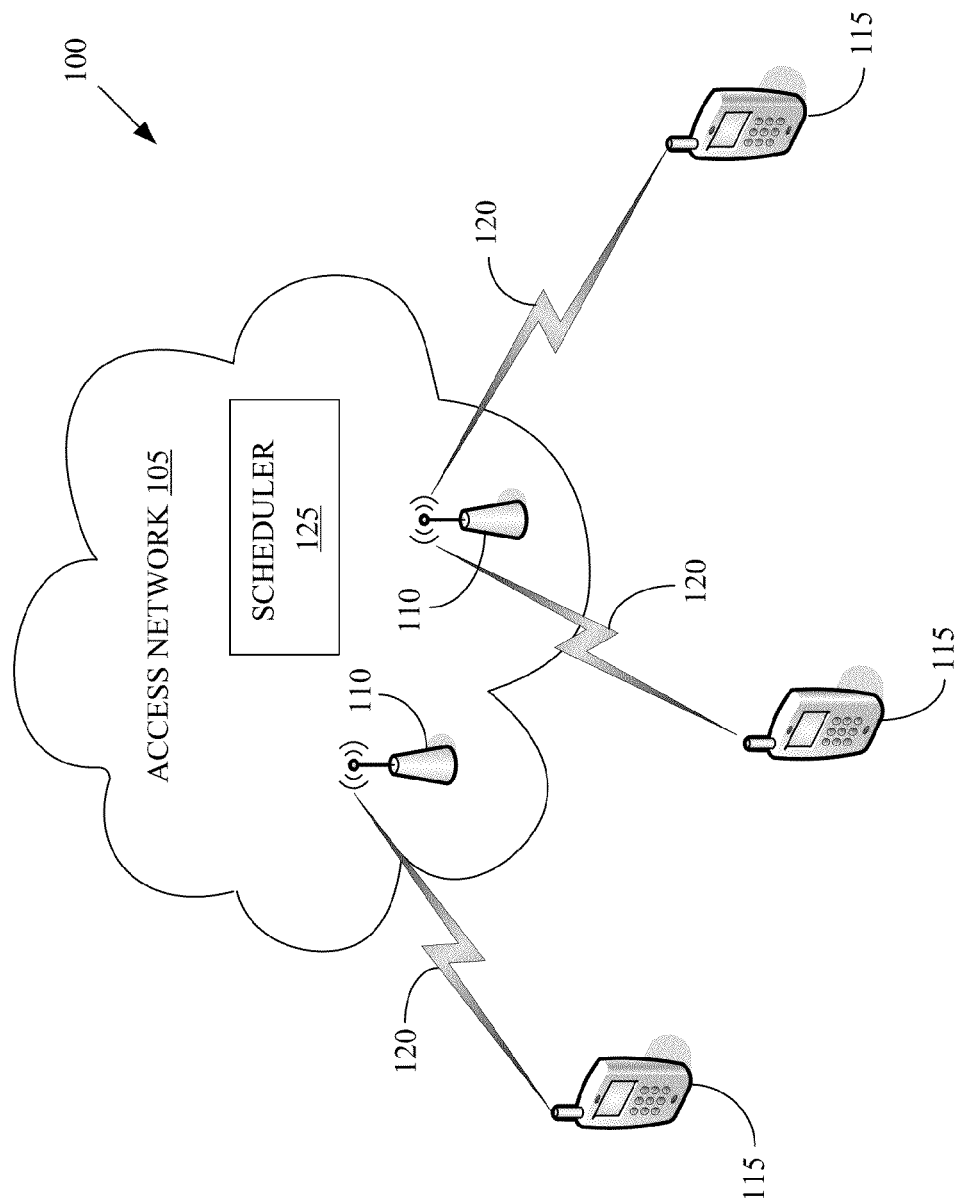
FIG. 1 conceptually illustrates one exemplary embodiment of a wireless communication system.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a wireless communication system 100. In the exemplary embodiment, the wireless communication system 100 includes an access network 105 that is used to provide wireless connectivity. The access network 105 may include one or more base stations 110 or other types of wireless access points. Exemplary wireless access points that could be used in the access network 105 include, but are not limited to, base station routers and wireless access points that are configured according to the Bluetooth standard and/or the IEEE 802 standards. Although not shown in FIG. 1, the access network 105 may also include other elements such as radio network controllers, base station controllers, routers, and gateways that may be interconnected using wired and/or wireless connections. Techniques for selecting, implementing, and/or operating these elements are known to persons of ordinary skill in the art having benefit of the present disclosure. In the interest of clarity, the specification only describes those aspects of selecting, implementing, and/or operating these elements that are relevant to the subject matter described herein.

The access network 105 provides wireless connectivity to one or more mobile units 115 over one or more wireless connections or air interfaces 120. In the illustrated embodiment, the air interfaces 120 support aggregation of multiple component carriers to extend the bandwidth of the air interfaces 120. One example of a wireless communication standard for extending the bandwidth of the air interfaces 120 is LTE-Advanced, which implements carrier aggregation to achieve extension of bandwidth beyond single Release 8 system bandwidth. Release 8 has a bandwidth of approximately 20 MHz and one embodiment of the LTE-A standard aggregates five component carriers to achieve a bandwidth of approximately 100 MHz. One purpose of carrier aggregation is to provide higher peak data rate to the mobile units 115 while minimizing the overhead channels such as PSCH, SSCH, broadcast information, and access channels.

Figure 2:
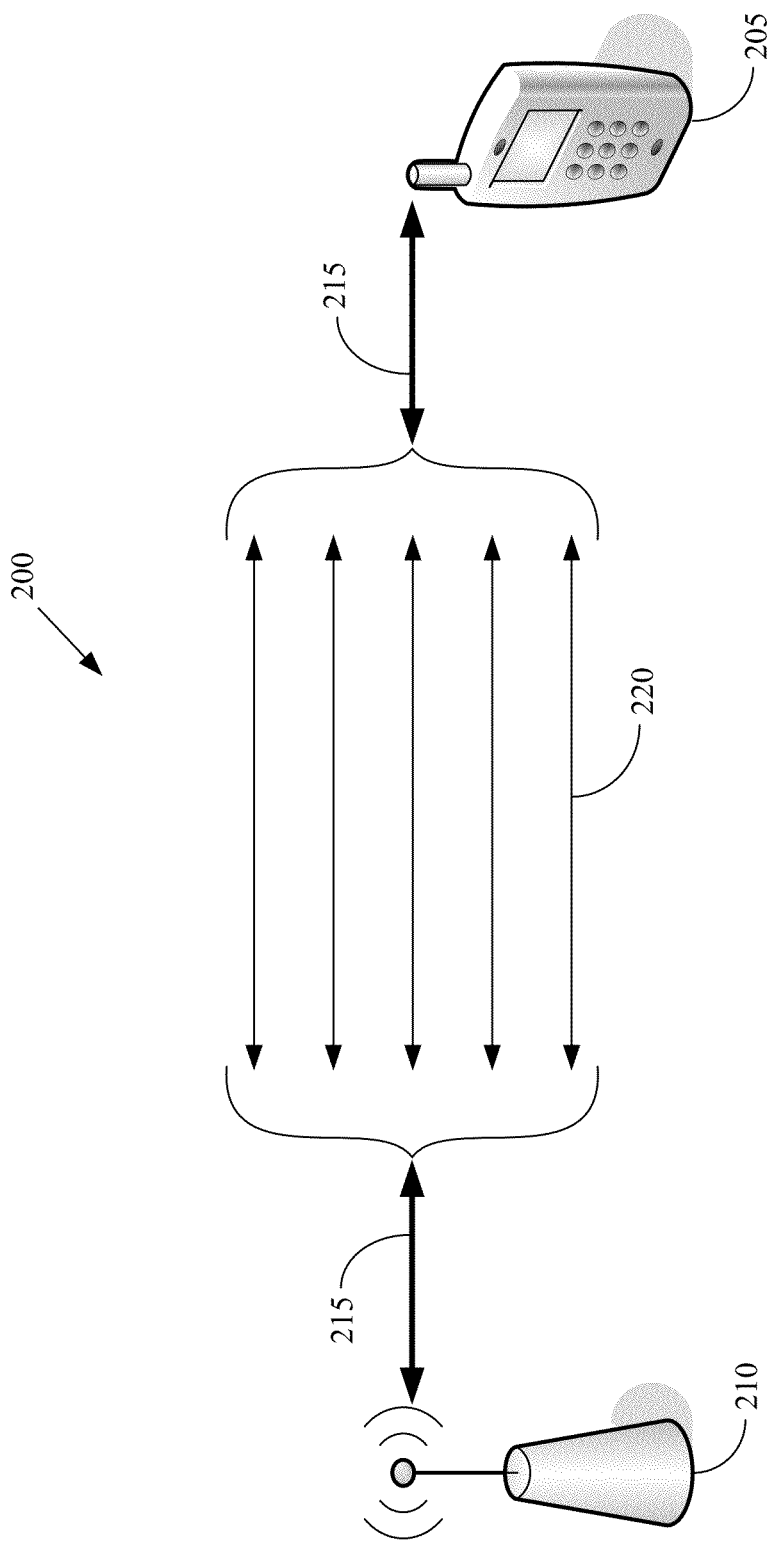
FIG. 2 conceptually illustrates one exemplary embodiment of a component carrier structure.

FIG. 2 conceptually illustrates one exemplary embodiment of a component carrier structure 200. In the illustrated embodiment, the mobile unit 205 communicates with a base station 210 over a wireless communication connection 215. The wireless communication connection 215 aggregates five carriers 220 (only one indicated by a numeral in FIG. 2) to extend the bandwidth of the connection 215. For example, if each carrier 220 supports a bandwidth of approximately 20 MHz, then the aggregated bandwidth of the wireless communication connection 215 is approximately 100 MHz. Persons of ordinary skill in the art having benefit of the present disclosure should appreciate that this particular embodiment is intended to be illustrative and that alternative embodiments of the wireless communication connection 215 may include more or fewer aggregated carriers 220 that support larger or smaller individual bandwidths and/or aggregated bandwidth.

Referring back to FIG. 1, one embodiment of the wireless communication system 100 supports asymmetric uplink/downlink (UL/DL) component carriers. This embodiment also supports separate coding of DL assignments and UL grants for each component carrier. Coding of the assignments and grants may be based on DCI format(s) of a single component carrier. A carrier indicator field (CIF) including 0-3 bits may also be provided to indicate the component carrier (CC) allocation of the respective physical data control channel (PDCCH). The carrier indicator field allows the allocation of traffic channels in the CC's that may be different from the CC on which PDCCH is transmitted, giving flexibility in carrier selection for PDCCH transmission. This feature may be particularly useful for asymmetric multi-carrier systems. In alternative embodiments, the wireless communication system 100 may support symmetric uplink/downlink (UL/DL) component carriers.

In one suggested implementation of the LTE-A standard, mobile units 115 would be required to blindly decode the PDCCH for all CCs in the coverage area to obtain information indicating their UL/DL allocation. This approach requires each mobile unit 115 to blindly search all CCs for PDCCHs in each of the CCs and to perform blind decoding for up to 48 different PDCCH hypotheses per CC. If the wireless communication system 100 supports five CCs, each mobile unit 115 would have to perform blind decoding for up to 240 different PDCCH hypotheses. Consequently, the complexity and power consumption of the mobile units 115 would increase as the number of CCs increases. Furthermore, the wireless communication system 100 would not be able to dynamically vary the CC allocation because this would require repeating the blind search and decode process every subframe.

An alternative implementation allocates an anchor carrier and one or more non-anchor carriers to each mobile unit 115. As used herein, the term "anchor carrier" will be understood to refer to a component carrier that carries the DL control channels, such as synchronization and system information, and the mobile units 115 use the anchor carrier for the initial access to the system 100. The anchor carrier may be distinguished from non-anchor carriers in one or more respects. In one embodiment, the anchor carrier contains Release-8 overhead channels such as the physical shared channel (PSCH), the SSCH, the Release-8 broadcast channel (BCH), paging and access channels, and the like. The anchor carrier may also carry an indication of scheduling information at the non-anchor carriers. In one embodiment, the anchor carrier conveys information indicating the active non-anchor carriers in the cell, information indicating the frequency, bandwidth, and/or UL/DL allocation for multi-carrier operation, information indicating a Release 8 compatible PDCCH, and information indicating a PDCCH for resource allocation on the anchor carrier for LTE-A UE.

In one embodiment, both the anchor carrier and the non-anchor carriers contain physical downlink control channels (PDCCH), pilot channels (PHICH), and physical downlink shared channels (PDSCH) in the DL frequency band. The anchor carrier and the non-anchor carrier also contain physical uplink control channels (PUCCH) and physical uplink shared channels (PUSCH) in the UL frequency. The non-anchor carriers do not require transmission of PSCH, SSCH to minimize the control channel overhead, Release-8 broadcast channel, paging or access channels. In various alternative embodiments, the anchor carrier and a subset of non-anchor carriers can be dynamically allocated for LTE-A mobile units 115. Dynamic allocation of component carriers is useful for multi-carrier operation in the same frequency band. Since the overhead channels are transmitted only in the anchor carrier, the remaining non-anchor carriers can be used primarily for traffic channels and other control channels for scheduling, resulting in higher peak throughput. The non-anchor carrier can be scheduled dynamically, depending on the buffer status and the power/interference condition, providing further efficiency in resource usage.

The access network 105 also includes a scheduler 125. Although a single scheduler 125 is depicted as part of the access network 105, persons of ordinary skill in the art having benefit of the present disclosure should appreciate that the scheduler 125 may be implemented at any location or combination of locations. The scheduler 125 is configured to schedule and/or allocate the anchor and/or non-anchor component carriers to the different mobile units 115. In one embodiment, the scheduler 125 can dynamically allocate anchor and non-anchor carriers to the mobile units 115. For example, the scheduler 125 may be configured to allocate, re-allocate, and/or de-allocate anchor and/or non-anchor component carriers for each subframe in the communication. The resource allocation for the anchor carrier is signalled in the PDCCH transmitted in the anchor carrier. The anchor carrier PDCCH for also carries additional bits indicating the non-anchor PDCCHs that have been allocated to the mobile units 115 that receives the anchor carrier PDCCH. The additional bits serve as a pointer to non-anchor carriers that have valid PDCCHs. These additional bits may be referred to as active (non-anchor) component carrier indicator (ACCI) bits. Mobile units 115 can decode the ACCI bits to determine the non-anchor CCs and may then attempt PDCCH decoding of the non-anchor component carriers. Similar scheduling may also be used for the uplink, as discussed herein.

Figure 3:
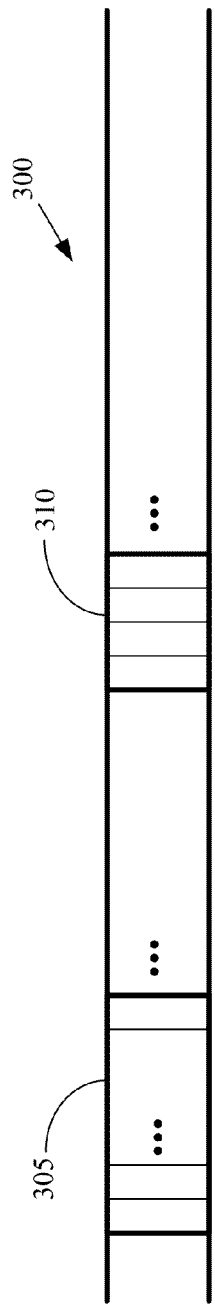
FIG. 3 conceptually illustrates one exemplary embodiment of a PDCCH of an anchor component carrier.

FIG. 3 conceptually illustrates one exemplary embodiment of a PDCCH 300 of an anchor component carrier. In the illustrated embodiment, the PDCCH 300 includes a set of bits 305 that are used to signal the resource allocation for the anchor carrier. The PDCCH 300 also includes four bits 310 that are used to indicate the non-anchor PDCCHs that have been allocated to the mobile unit. Although four bits 310 are depicted in FIG. 3, persons of ordinary skill in the art having benefit of the present disclosure should appreciate that other numbers of bits 310 may be used to signal the non-anchor PDCCHs that have been allocated to the mobile units. Table 1 shows an example of possible usage of ACCI bits to indicate a full set of component carrier allocation combinations, depending on the number of bits available. A 4-bit ACCI field can support 5 CCs with full flexibility for a complete combination set of non-anchor CC allocations. If the number of bits in the ACCI field is less than the number required to indicate all possible CC allocations, a selective subset of combinations of non-anchor CC allocation could be indicated through higher layer signaling. One example of a bitmap construction for the ACCI field to support 5 CC allocations is shown in Table 2.

TABLE 1

Possible usage of ACCI field depending on number of bits (Example: maximum of 5 CCs, 2 active CCs allocated in a subframe)

| Number of bits | Usage | Number of PDCCH blind decodes | Max number of CCs allocated |
|---|---|---|---|
| 1 | Indicates additional allocation in one other CC | Up to ×4 | 1 (anchor) + 1 (non-anchor) |
| 2 | Indicates index of one other CC allocated | Up to ×2 | 1 (anchor) + 1 (non-anchor) |
| 3 | Indicates indices of two other CCs allocated | Up to ×2 | 1 (anchor) + 2 (non-anchor) |
| 4 | Indicates indices of all other CCs allocated | Up to ×2 | 1 (anchor) + 4 (non-anchor) |

TABLE 2

Bitmap of the ACCI field indicating the active non-anchor component carrier (NCC) in a cell with 5 CCs

| ACCI field | Active non-anchor component carriers |
|---|---|
| 0000 | Reserved |
| 0001 | NCC1 |
| 0010 | NCC2 |
| 0011 | NCC3 |
| 0100 | NCC4 |
| 0101 | NCC1 + NCC2 |
| 0110 | NCC1 + NCC3 |
| 0111 | NCC1 + NCC4 |
| 1000 | NCC2 + NCC3 |
| 1001 | NCC2 + NCC4 |
| 1010 | NCC3 + NCC4 |
| 1011 | NCC1 + NCC2 + NCC3 |
| 1100 | NCC1 + NCC2 + NCC4 |
| 1101 | NCC1 + NCC3 + NCC4 |
| 1110 | NCC2 + NCC3 + NCC4 |
| 1111 | NCC1 + NCC2 + NCC3 + NCC4 |

FIG. 4 conceptually illustrates one exemplary embodiment of a method 400 of indicating the component carrier allocation. In the illustrated embodiment, anchor and non-anchor component carriers are allocated (at 405) to user equipment. For example, a scheduler may determine (at 405) the allocation of anchor and/or non-anchor component carriers for a particular subframe. An access network may then be configured (at 410) to transmit information over the allocated anchor carrier to the user equipment. In one embodiment, configuring (at 410) the access network may include configuring transmitters in one or more access points or base stations to transmit in the frequency band associated with the allocated anchor carrier. The access network may also determine bits representative of the resource allocation for the anchor carrier and bits to indicate the allocated non-anchor component carriers. The bits may then be encoded for transmission over the anchor carrier, e.g., using the PDCCH of the anchor carrier.

The PDCCH information may be transmitted over the air interface. In the illustrated embodiment, the anchor carrier information is transmitted (at 415) in a first field of the PDCCH. The information identifying the non-anchor carriers may be transmitted (at 420) in a second field of the PDCCH. Although FIG. 4 depicts transmission of the first and second field as two separate and sequential steps, persons of ordinary skill in the art having benefit of the present disclosure should appreciate that the first and second fields may be transmitted in any order and/or portions of the fields may be interleaved with each other and/or with other information bits. Persons of ordinary skill in the art having benefit of the present disclosure should also appreciate that dynamic allocation of the component carriers may be implemented. In embodiments that implement dynamic allocation, the method 400 may be iterated, e.g., once every subframe or any other selected time, subframe, or frame interval.

FIG. 5 conceptually illustrates one exemplary embodiment of a method 500 that can be used by mobile units or user equipment for decoding PDCCH for multiple component carriers. In the illustrated embodiment, user equipment attempts (at 505) to decode the PDCCH on the anchor carrier. For example, user equipment may blindly decode (at 505) the PDCCH on the anchor carrier. The user command then determines (at 510) whether decoding of the PDCCH has generated a valid PDCCH and ballot information indicating allocated non-anchor carriers (ACCI). If the decoding process failed, then the method 500 ends. However, if the line decoding process generated (at 510) valid PDCCH and ACCI, and the user equipment proceed to decode (at 515) the non-anchor carriers that have valid PDCCHs indicated by the decoded anchor carrier PDCCH. In one embodiment, the user woman performs (at 515) a blind decode of the non-anchor carrier PDCCHs. After successful decoding (at 515) of PDCCHs on the non-anchor CCs indicated by ACCI, the user equipment can be configured (at 520) for communication over the air interface using the anchor carrier and the non-anchor carriers that have been allocated to the user equipment. As discussed herein, the method 500 may be iterated, e.g., once every subframe or any other selected time, subframe, or frame interval, so that dynamic allocation of the anchor carrier and/or non-anchor carriers can be implemented.

Figure 6:
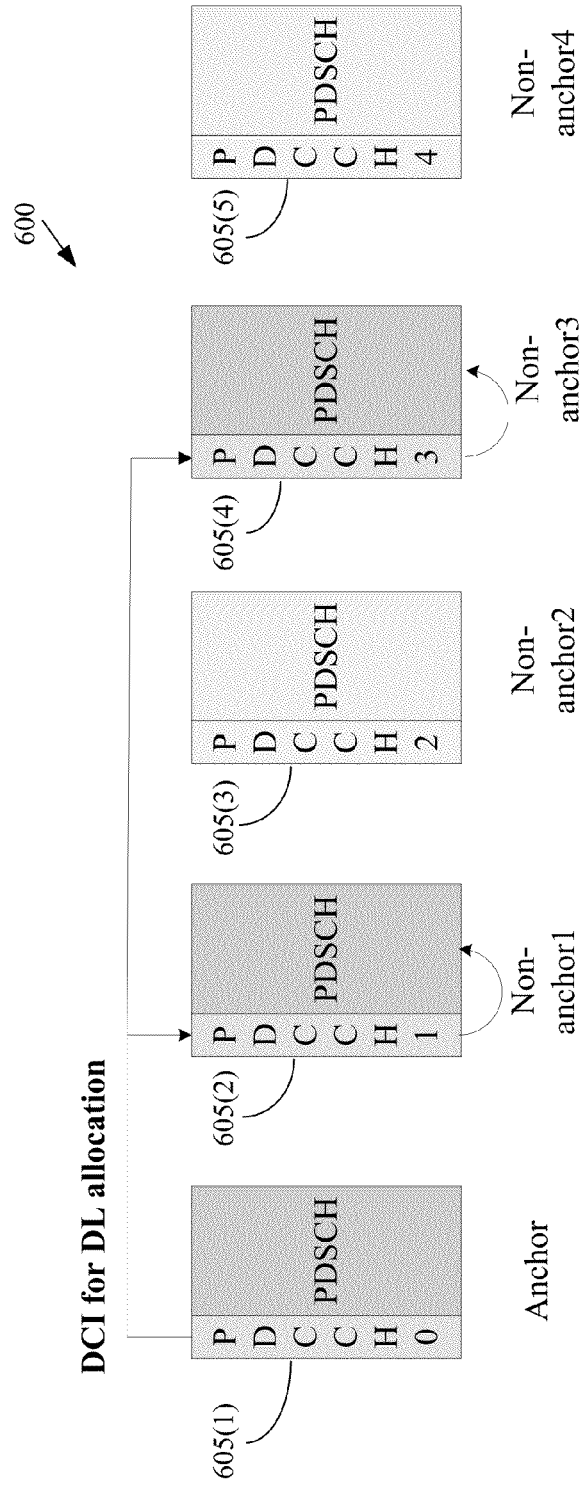
FIG. 6 conceptually illustrates one exemplary embodiment of a downlink (DL) channel structure in a multi-component carrier system.

FIG. 6 conceptually illustrates one exemplary embodiment of a downlink (DL) channel structure 600 in a multi-component carrier system. In the illustrated embodiment, the system supports 5 component carriers 605(1-5) in the cell coverage area. However, as discussed herein, this number of component carriers is intended to be illustrative and not limiting. Alternative embodiments may have different numbers of component carriers. In the illustrative exemplary embodiment of FIG. 6, the component carrier 605(1) is allocated as an anchor carrier and the other four component carriers 605(2-5) are available for allocation as non-anchor carriers. In the interest of clarity and ease of illustration, the PDCCH in each component carrier 605(1-5) is assumed to carry the resource allocation for the component carrier 605(1-5). However, in alternative embodiments, the PDCCH in some of the component carriers 605(1-5) may also be used to carry the resource allocations for other component carriers 605(1-5).

The resource allocation shown in FIG. 6 depicts the resources that are allocated to the user equipment for a particular subframe. In the illustrated embodiment, the user equipment is allocated DL resources in the anchor carrier 605(1) and non-anchor component carriers 605(2, 4). The PDCCH for the anchor carrier 605(1) includes information that identifies the non-anchor component carriers 605(2, 4). For example, the PDCCH in an LTE-A DCI format for DL allocation contains the ACCI indicating that non-anchor component carriers 605(2, 4) have PDCCHs for DL (as indicated by the solid arrow pointers to the corresponding PDCCH). The user equipment can perform PDCCH blind decoding in non-anchor component carriers 605(2, 4) to retrieve the resource allocation for PDSCH decoding on these carriers. For example, as shown in FIG. 6, the resource allocation for PDSCH can be indicated by a pointer elements within the PDCCH of the non-anchor component carriers 605(2, 4).

Figure 7:
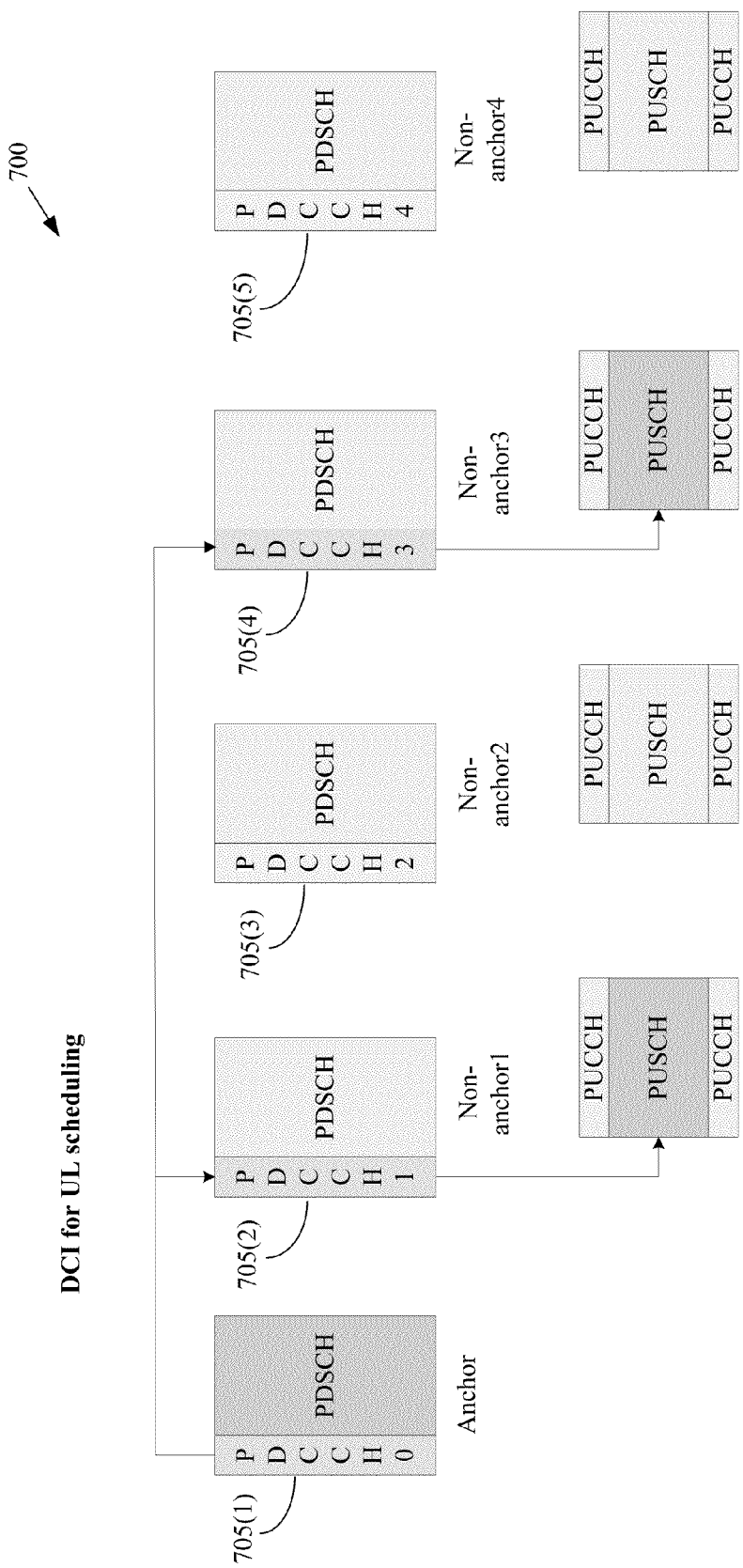
FIG. 7 conceptually illustrates one exemplary embodiment of an UL/DL channel structure in a multi-component carrier system.

FIG. 7 conceptually illustrates one exemplary embodiment of an UL/DL channel structure 700 in a multi-component carrier system. In the illustrated embodiment, the system supports 5 component carriers 705(1-5) in the cell coverage area. However, as discussed herein, this number of component carriers is intended to be illustrative and not limiting. Alternative embodiments may have different numbers of component carriers. The component carriers 705(1-5) include both uplink and downlink resources. One component carrier 705(1) is allocated as an anchor carrier and the other four component carriers 705(2-5) are available for allocation as non-anchor carriers. In the interest of clarity and ease of illustration, the PDCCH in each component carrier 705(1-5) is assumed to carry the UL resource allocation for the component carrier 705(1-5). However, in alternative embodiments, the PDCCH in some of the component carriers 705(1-5) may also be used to carry the uplink and or downlink resource allocations for other component carriers 705(1-5).

The resource allocation shown in FIG. 7 depicts the resources that are allocated to the user equipment for a particular subframe. In the illustrated embodiment, the user equipment is allocated resources in the anchor carrier 705(1) and non-anchor component carriers 705(2, 4). The PDCCH for the anchor carrier 705(1) includes information that identifies the non-anchor component carriers 705(2, 4), e.g., pointers to the PDCCH for the non-anchor component carriers 705(2, 4) that are indicated by the solid arrows. For example, the PDCCH in an LTE-A DCI format for UL scheduling contains the ACCI indicating that non-anchor component carriers 705(2, 4) have PDCCHs for UL. After PDCCH blind decoding in the non-anchor component carriers 705(2, 4), the user equipment can retrieve the resource allocation for PUSCH decoding on these carriers.

Information identifying the PUCCH for one or more of the component carriers 705(1-5) can also be conveyed to the user equipment. For symmetric UL/DL carriers, one can define an association between UL CC and DL CC from the spectrum allocation of the operator or by higher layer signalling such as radio resource control (RRC) signalling. In this case, it may not be necessary to indicate PUCCH CC separately because this channel may correspond to the DL PDSCH CC. For asymmetric UL/DL carriers, in the special case where there is no scheduled UL traffic, the component carriers 705 that are used for PUCCH transmission corresponding to the DL transmission can be signalled to the user equipment. For example, the component carrier 705 can be semi-statically indicated by higher layer signaling (e.g., RRC signaling). For another example, the component carrier 705 can be dynamically indicated in DL allocation in PDCCH.

Semi-static PUCCH CC indication allows the system to reuse Release 8 PUCCH resource allocation techniques and algorithms. In one embodiment, which may be applicable to the case where the number of UL CCs exceeds the number of DL CCs, one or a subset of the UL carriers is preconfigured semi-statically to be associated with the DL carrier for PUCCH transmission. The semi-static configuration is done by higher layer signalling, e.g. either by broadcast message or by dedicated RRC signaling. In one alternative embodiment, which may be applicable to the case where the number of UL CCs is less than the number of DL CCs, the PUCCH component carrier 705 is indicated in a dedicated RRC message that indicates the specific PUCCH component carrier 705 that is allocated to the user equipment. This scenario may occur and systems that implement bandwidth extension due to higher bandwidth requirements in the DL direction (relative to the UL direction). Due to smaller number of UL CCs, ACK/NAK corresponding to multiple DL CCs may be mapped UL CCs for PUCCH transmission. The ACK/NAK bundling or multiplexing method in TDD could be used to provide required ACK/NAK resources.

Embodiments of the techniques described herein can be used to implement a framework for a low-overhead component carrier allocation. In one embodiment, a two-step procedure for indicating the PDCCH component carriers is described for the purpose of reducing PDCCH blind decodes. Dynamic resource allocation in multiple carriers may be implemented using PDSCH and PUSCH CC indication. For example, a 4-bit active component carrier indicator (ACCI) field may be included in the LTE-A DCI format to indicate the dynamically allocated component carriers for uplink and/or downlink. For PUCCH, a semi-static configuration method can be used to indicate CC for PUCCH transmission. These approaches have a number of advantages over conventional practice. For example, the dynamic component carrier allocation and indication techniques described herein allow low overhead multi-carrier resource allocation with reduced UE PDCCH blind decoding attempts, while potentially reusing Release-8 control channel configurations. Furthermore, semi-static configuration of the component carrier indication using RRC signalling is relatively simple and may allow reuse of portions of the Release-e8 PUCCH configuration.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method involving an access network and at least one user equipment that support communication over an air interface using a plurality of component carriers, comprising:
transmitting, from the access network, scheduling information comprising at least one downlink grant, at least one uplink grant, a first field of a first component carrier selected from the plurality of component carriers comprising information indicating that the first component carrier is an anchor carrier for said at least one user equipment, and a second field of the first component carrier comprising information indicating that at least one second component carrier selected from the plurality of component carriers is allocated as at least one non-anchor carrier for said at least one user equipment, so that said at least one user equipment can blindly decode the first field of the first component carrier to determine whether the first component carrier is its anchor carrier and subsequently decode the second field of the first component carrier to determine whether said at least one second component carrier is at least one non-anchor carrier.

2. The method of claim 1, wherein transmitting the information indicating that the first component carrier is the anchor carrier comprises transmitting information that can be blindly decoded by said at least one user equipment.

3. The method of claim 2, wherein transmitting the information indicating that said at least one second component carrier is said at least one non-anchor carrier comprises transmitting information that allows said at least one user equipment to decode said at least one second component carrier.

4. The method of claim 1, wherein transmitting information in the second field of the first component carrier comprises transmitting a second field having a number of bits sufficient to indicate each available combination of the anchor carrier and said at least one non-anchor carrier that can be selected from the plurality of component carriers.

5. The method of claim 1, wherein transmitting information in the first and second fields comprises transmitting information indicating the anchor carrier and said at least one non-anchor carrier for an associated subframe.

6. The method of claim 5, comprising dynamically changing the information transmitted in the first and second fields to indicate changes in at least one of the anchor carrier and said at least one non-anchor carrier over a plurality of subframes.

7. The method of claim 1, wherein transmitting information in the first and second fields comprises transmitting information indicating the anchor carrier and said at least one non-anchor carrier that are allocated to support physical downlink control channels for said at least one user equipment.

8. The method of claim 1, wherein transmitting information in the first and second fields comprises transmitting coded information indicating a scheduling grant allocating physical uplink shared channels supported by the anchor carrier and said at least one non-anchor carrier to said at least one user equipment.

9. The method of claim 8, comprising transmitting information indicating at least one physical uplink control channel allocated to said at least one user equipment.

10. The method of claim 9, wherein transmitting said information indicating said at least one physical uplink control channel comprises transmitting said information using radio resource control signaling.

11. The method of claim 9, wherein transmitting said information indicating said at least one physical uplink control channel comprises transmitting said information using at least one physical downlink control channel to said at least one user equipment.

12. A method involving an access network and at least one user equipment that support communication over an air interface using a plurality of component carriers, comprising:
  receiving, at said at least one user equipment, scheduling information comprising at least one downlink grant, at least one uplink grant, a first field of a first component carrier selected from the plurality of component carriers comprising information indicating that the first component carrier is an anchor carrier for said at least one user equipment, and a second field of the first component carrier comprising information indicating whether at least one second component carrier selected from the plurality of component carriers is allocated as at least one non-anchor carrier for said at least one user equipment; and
  blindly decoding the first field to determine that the first component carrier is the anchor carrier and subsequently decoding the second field to determine whether said at least one second component carrier is at least on non-anchor carrier.

13. The method of claim 12, comprising blindly decoding, at said at least one user equipment, the first component carrier to determine that the first component carrier is the anchor carrier using the decoded information in the first field of the first component carrier.

14. The method of claim 13, comprising decoding, at said at least one user equipment, said at least one second component carrier using said information in the second field to identify said at least one second component carrier prior to decoding.

15. The method of claim 12, wherein receiving information in the second field of the first component carrier comprises receiving information in a second field having a number of bits sufficient to indicate each available combination of the anchor carrier and said at least one non-anchor carrier that can be selected from the plurality of component carriers.

16. The method of claim 12, wherein receiving information in the first and second fields comprises receiving information indicating the anchor carrier and said at least one non-anchor carrier for an associated subframe.

17. The method of claim 16, comprising receiving dynamically changing information transmitted in the first and second fields to indicate changes in at least one of the anchor carrier and said at least one non-anchor carrier over a plurality of subframes.

18. The method of claim 12, wherein receiving information in the first and second fields comprises receiving information indicating the anchor carrier and said at least one non-anchor carrier that are allocated to support physical downlink control channels for said at least one user equipment.

19. The method of claim 12, wherein receiving information in the first and second fields comprises receiving coded information indicating a scheduling grant allocating physical uplink shared channels supported by the anchor carrier and said at least one non-anchor carrier to said at least one user equipment.

20. The method of claim 19, comprising receiving information indicating at least one physical uplink control channel allocated to said at least one user equipment.

21. The method of claim 20, wherein receiving said information indicating said at least one physical uplink control channel comprises receiving radio resource control signaling indicating said information.

22. The method of claim 20, wherein receiving said information indicating said at least one physical uplink control channel comprises receiving said information over at least one physical downlink control channel between the access network and said at least one user equipment.

23. The method of claim 12, comprising using the information in the first and second field to configure said at least one user equipment for communication over the anchor carrier and said at least one non-anchor carrier.

24. The method of claim 12, wherein decoding the second field comprises decoding the second field to determine one or more bits that serve as pointers to said at least one second component carrier that is said at least one non-anchor carrier.

25. The method of claim 24, comprising decoding at least one physical downlink control channel (PDCCH) associated with the non-anchor component carriers indicated by the pointers in the second fields.

* * * * *